United States Patent [19]
Reeve

[11] 3,820,858
[45] June 28, 1974

[54] TRACK LUBRICATION FOR TRACKED VEHICLE, IN PARTICULAR SNOWMOBILES

[75] Inventor: Paul H. Reeve, River Vale, N.J.
[73] Assignee: Auto Research Corporation, Boston, N.J.
[22] Filed: Apr. 28, 1972
[21] Appl. No.: 248,622

[52] U.S. Cl. .................................. 305/14, 180/5 R
[51] Int. Cl. ............................................ B62m 27/02
[58] Field of Search ................... 184/15 R, 15 A, 5; 180/5 R, 9.2 R, 9; 305/14

[56] References Cited
UNITED STATES PATENTS

| | | | |
|---|---|---|---|
| 849,882 | 4/1907 | Bartley | 305/14 |
| 1,561,996 | 11/1925 | Perry | 305/14 |
| 3,109,514 | 11/1963 | Deflandre | 184/5 |
| 3,485,312 | 12/1969 | Swenson | 180/5 R |

*Primary Examiner*—Richard J. Johnson
*Attorney, Agent, or Firm*—Ostrolenk, Faber, Gerb & Soffen

[57] ABSTRACT

A ground contacting track of a snowmobile moves past a guide slide provided with a lubricant delivery formation, e.g. a T-shaped groove. The vertical leg of the T leads from an oil supply means. The cross leg of the T extends across the slide and delivers oil across the slide. The cross leg is located near the initial point of contact between the slide and the track and where the track is first pressed against the slide by contacting the ground.

6 Claims, 5 Drawing Figures

PATENTED JUN 28 1974　　　　　　　　　　　3,820,858

TRACK LUBRICATION FOR TRACKED VEHICLE, IN PARTICULAR SNOWMOBILES

The present invention relates to lubrication of the track of a tracked vehicle, and in particular the slide track of a vehicle used on snow, particularly a snowmobile.

In one form of tracked snowmobile, the track comprises a plurality of driven belts, across which extend a plurality of closely spaced cleats that contact the snow and move the snowmobile. The track is guided and positioned by one or more stationary slides past which the moving belts and cleats slide. In some forms of such snowmobiles, the belts are of a width such that each slide is directly engaged by the moving cleats. Large friction forces develop between the track and/or cleats and the slide.

Quite frequently, the slide is formed of or covered with a plastic-like or slippery material, such as polytetrafluoroethylene, or Teflon, and the cleats are formed of hard steel. In the absence of adequate lubrication, the slide rapidly wears down shortening the useful life of the snowmobile slide.

If the snow is sufficiently soft packed and deep enough and/or the cleats churn up enough snow, the snow itself moves between the track and the slide, melts and lubricates the track. However, if the snow is not sufficiently deep or is too hard packed, or the snowmobile crosses a clear area, this natural lubrication is absent and the slide wears.

In accordance with the present invention, lubricant is applied to the track of the snowmobile so as to lubricate the operative run of the track as it moves past the slide and prevent needless wearing of the slide.

Lubricant should be applied at a point sufficiently close to the initial point of contact between the track and the slide so that the snow washing across the track after lubricant has been applied does not wash or rub away the lubricant. Lubricant should also not be applied so far along the operative run of the track that the track rubs across an unlubricated portion of the slide. Hence, lubricant should be applied in the immediate vicinity of the initial point of contact between the track and the slide as the track moves past the slide on its operative run. For optimum lubrication without any loss of lubricant, the lubricant should be applied to the track immediately after the initial point of contact between the track and the slide. However, snow and dirt will be churned up by the track and jammed into the lubricant outlet to the track, whereby the flow of lubricant onto the track would be soon blocked. Hence, applying lubricant to the track shortly before the initial point of contact between the slide and the track has been found to be most practical.

Lubricant is best directed onto the track through the slide. Lubricant is fed to a lubricant delivery means formed in the slide and then moves out of this means onto the track passing by. The lubricant delivery means is an appropriate formation in the slide for transferring lubricant to the track. In a preferred embodiment, the delivery means is a cut-out or groove formed in the slide. There is considerable snow and dirt churned up in the area of the delivery means. Hence, lubricant is preferably first fed to a transfer means or formation, e.g. a transfer groove, which extends along the slide away from the track and is disposed to lead downstream along the slide to the delivery means, e.g. the delivery groove. Snow and dirt that are thrown up by the track and contact the slide will not jam up into the lubricant dispenser. Instead, they will be normally rubbed and washed away out of the transfer and dispensing grooves and the lubricant will cooperate in washing the material out of such grooves, whereby continuous lubrication of the snowmobile will be obtained. In a preferred arrangement, the transfer and delivery grooves are arranged in a T shape with the delivery groove being the cross leg of the T and extending across the slide and the delivery groove being the vertical leg of the T and extending upstream along the slide to an outlet from a conventional lubricant dispensing apparatus. Other groove configurations or formations can be devised for the slide for accomplishing the same purpose.

It is a primary object of the present invention to lubricate the track of a tracked vehicle, particularly a snowmobile.

It is another object of the present invention to provide tracked vehicle lubrication means which would not be jammed or otherwise adversely affected by snow, dirt, etc. kicked up by the track.

It is a further object of the present invention to maximize lubrication between the slide and the vehicle track.

These and other objects of the present invention will become apparent from the following description of the accompanying drawings, in which.

Figure 1:
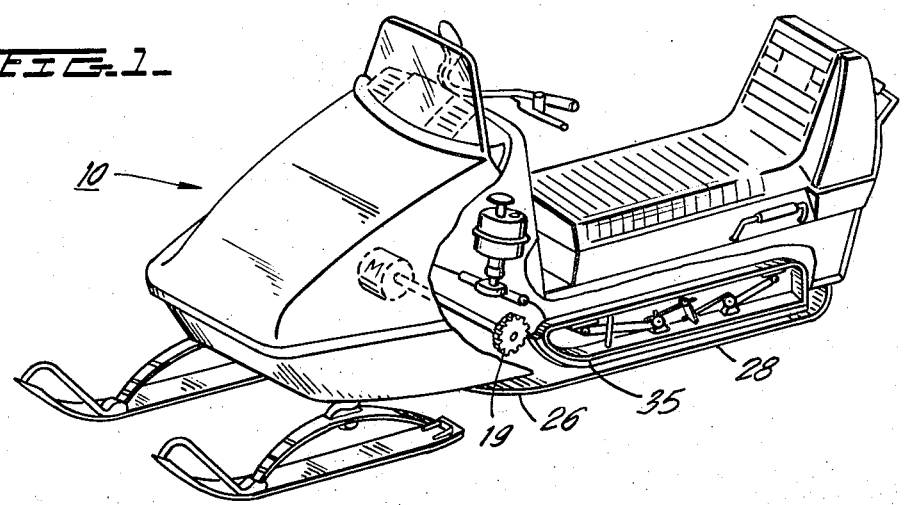
FIG. 1 is a perspective view of a snowmobile adapted with the lubrication apparatus of the present invention.
Figure 2:
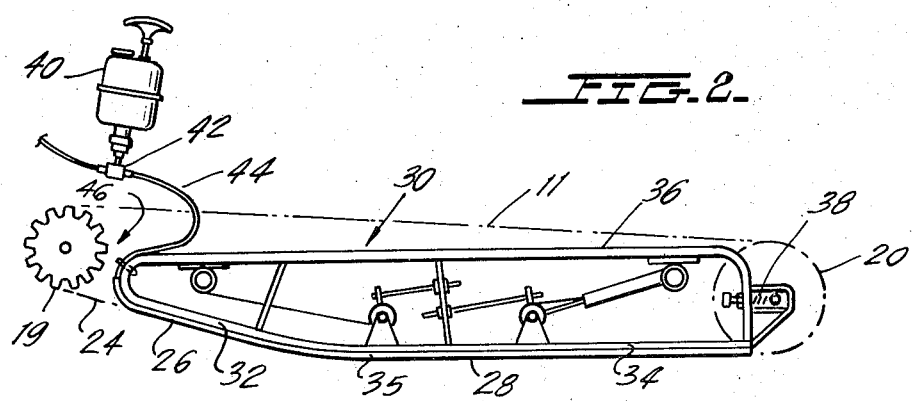
FIG. 2 is a side view of a snowmobile slide and slide track of the snowmobile of FIG. 1.
Figure 3:
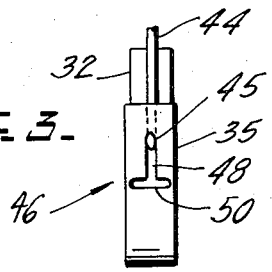
FIG. 3 is an end view of the slide of FIG. 2 in the direction of arrows 3 in FIG. 2.
Figure 4:
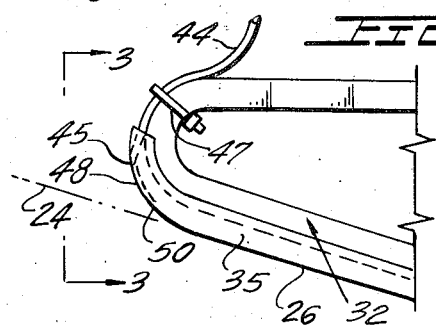
FIG. 4 is a close-up enlarged view of the connection of the lubrication means to the slide.
Figure 5:
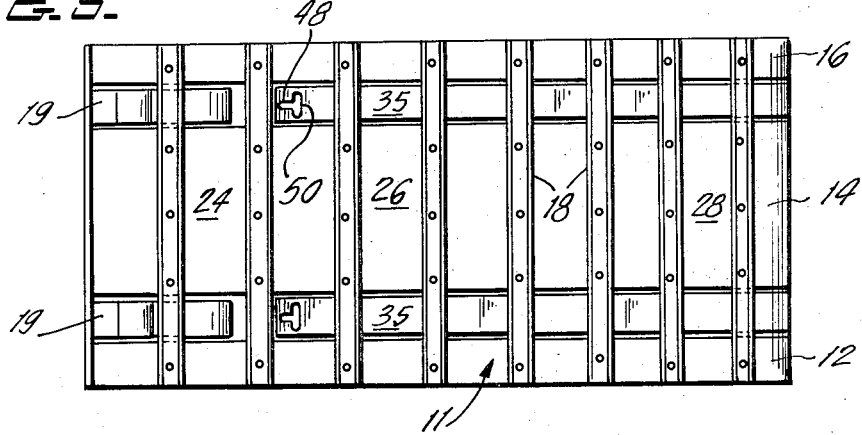
FIG. 5 is a bottom view of the slide and endless track showing the lubricant delivery grooves.

Referring to the drawings, conventional motorized snowmobile 10 has a track 11 comprised of belts 12, 14 and 16 and a plurality of steel cleats 18 which extend across and are attached to the belts and provide the driving surface for the track. Track 11 passes around toothed drive gears 19 and idler roller 20. The teeth of gears 19 are spaced apart so that each succeeding tooth engages a succeeding cleat 18. Rotation of gears 19 by conventional internal combustion engine M moves track 11 and thereby moves the snowmobile.

The lower run of track 11 includes a non-operative section 24 which descends from gears 19 toward the ground and which is not then supporting or driving the snowmobile, a section 26 which is functionally the same as section 24 except that it is in rubbing engagement with slide 30, to be described, and an operative run section 28 which is also in engagement with the slide and which is supporting the snowmobile and is in contact with the ground and drives the snowmobile.

The invention will be described with respect to only one slide 30, it being understood that there may be two or more identical such slides.

Gears 19 cooperate with the shape of slide 30 to hold track 11 initially apart from slide 30 during operative run section 24.

Lubricant is applied to track 11 immediately before the initial contact between track lower run section 26 and slide 30.

Track 11 moves past slide 30 which includes a lower edge surface having section 32 which is in rubbing engagement with track lower run section 26 and section 34 in engagement with and guiding track lower run section 28. In accordance with the preferred arrangement, the entire lower edge 32, 34 of the slide is covered by a slide sheath 35 formed of a relatively long wearing, slippery material which lubricant can readily pass over, such as Teflon.

The slide includes an upper supportive run 36, adjustment means 38 for adjusting the tension of track 11 and various slide supporting and rigidifying means.

Lubricant is fed from conventional manually operable lubricant pump 40, through flow controlling fitting 42, and a conduit 44 for each slide, through conduit outlet 45 to lubricant transfer unit 46. Fastening means 47 holds conduit 44 in position against slide 32 so that it properly communicates to outlet 45 and unit 46.

The portion of slide sheath 35 immediately upstream of the initial contact location between the lower run of track 11 and the slide sheath curves rearwardly from the vertical and is provided with a T-shaped groove for delivering lubricant to the track. Conduit 44 passes through slide sheath 35 and opens into transfer groove 48. The outlet 45 from conduit 44 into vertical groove 48 is sufficiently above the ground, above the snow over which the snowmobile is moving and above the lower run of track 11 so that the outlet will not be clogged by snow or dirt.

The lubricant flows vertically down through transfer groove 48 which is the vertical leg of the T-groove and into delivery groove 50 which extends substantially completely across slide 32 and slide sheath 35. Delivery groove 50 is in the vicinity of and particularly just upstream of the location of initial contact between track 11 and slide 30. Transverse delivery groove 50 is so positioned and transfer groove 48 is of a length and so positioned that the lubricant in groove 50 overflows onto the interior surface of track 11, and particularly the cleats 18 thereof, as the track section 26 first contacts slide sheath 35.

By means of the present invention, adequate lubrication is provided to the track of a tracked vehicle, and in particular a snowmobile, to facilitate movement of the track past the stationary support slide without damage to the slide, thereby prolonging snowmobile life and increasing its efficiency.

Although this invention has been described with respect to its preferred embodiments, it should be understood that many variations and modifications will now be obvious to those skilled in the art and, therefore, it is preferred that the invention be limited not by the specific disclosure herein but only by the appended claims.

I claim:

1. Lubrication system for a tracked vehicle, particularly a snowmobile, wherein said vehicle comprises:
    a closed-loop comprised of a plurality of cleats secured to a closed loop belt track which moves the vehicle; said track having an operative run portion that moves along a first pathway to move the vehicle; means for moving said track; a slide support structure on the vehicle past which said track operative run moves and which engages and guides said track as it passes along the operative run portion; means guiding said track along a second pathway at which said track is held apart from said slide before said track enters its said operative run and which guides said track to engage said slide at an initial contact location in the vicinity of the start of said first pathway of said operative run;
    said lubrication system comprising operator controlled means for delivering lubricant under pressure through said slide to said track cleats in the vicinity of said initial contact location and prior to engagement of said slide by said track to facilitate the cleansing effect of the lubricant upon the track.

2. The lubrication system of claim 1, wherein said slide comprises an engagement surface which is slidably engaged by said track operative run; said lubrication system comprising said slide engagement surface being provided with a lubricant delivery formation located in the vicinity of said initial contact location for dispensing lubricant.

3. Lubrication system for a tracked vehicle, particularly a snowmobile, wherein said vehicle comprises:
    a track which moves the vehicle; said track having an operative run that moves along a first pathway to move the vehicle; means for moving said track; a slide on the vehicle past which said track operative run moves and which engages and guides said track operative run; means guiding said track along a second pathway at which said track is held apart from said slide before said track enters its said operative run and which guides said track to engage said slide at an initial contact location in the vicinity of the start of said first pathway of said operative run;
    said lubrication system comprising means for delivering lubricant to said track in the vicinity of said initial contact location;
    said delivery formation comprising a groove arrangement including a dispensing groove extending transversely across said slide engagement surface;
    said dispensing groove being located on said slide engagement surface at a location away from said initial contact location and out of engagement with said track.

4. Lubrication system for a tracked vehicle, particularly a snowmobile, wherein said vehicle comprises:
    a track which moves the vehicle; said track having an operative run that moves along a first pathway to move the vehicle; means for moving said track; a slide on the vehicle past which said track operative run moves and which engages and guides said track operative run; means guiding said track along a second pathway at which said track is held apart from said slide before said track enters its said operative run and which guides said track to engage said slide at an initial contact location in the vicinity of the start of said first pathway of said operative run;
    said lubrication system comprising means for delivering lubricant to said track in the vicinity of said initial contact location;
    said delivery formation comprising a groove arrangement including a dispensing groove extending transversely across said slide engagement surface;
    said groove arrangement further comprising a transfer groove in said slide engagement surface which intersects said dispensing groove; conduit means communicating with and delivering lubricant to said transfer groove and means for pumping lubricant through said conduit means to said transfer groove.

5. The lubrication system of claim 4, wherein said transfer groove extends along said slide engagement surface in a direction away from said initial contact location and away from said track operative run; said conduit means meeting said transfer groove away from said initial contact location and said track operative run.

6. The lubrication system of claim 5, wherein said slide includes a portion that is out of engagement with said track and that extends toward said initial contact location and that extends in a downwardly direction with respect to said vehicle, which said slide portion is provided with said groove arrangement; said dispensing groove being the portion of said groove arrangement that is lowermost.

* * * * *